United States Patent
Yamakoshi

Patent Number: 6,074,017
Date of Patent: Jun. 13, 2000

[54] LIQUID PRESSURE CONTROL DEVICE FOR LOAD RESPONDING BRAKE

[75] Inventor: Mutsuro Yamakoshi, Higashimatsuyama, Japan

[73] Assignee: Jidosha KiKo Co., Ltd., Tokyo, Japan

[21] Appl. No.: 08/995,204

[22] Filed: Dec. 19, 1997

[30] Foreign Application Priority Data

Dec. 20, 1996 [JP] Japan .................................. 8-341295

[51] Int. Cl.$^7$ ...................................................... B60T 8/18
[52] U.S. Cl. ........................... 303/9.69; 303/22.8; 303/56
[58] Field of Search .................... 303/9.69 OR, 303/9.75, 22.8, 52, 56, 22.4, 9.62, 9.66, 9.72, 9.74, 9.61, 22.5, 22.7; 137/505.18; 251/336

[56] References Cited

U.S. PATENT DOCUMENTS

| | | | |
|---|---|---|---|
| 3,442,557 | 5/1969 | Oberthur | 303/9.75 |
| 3,650,571 | 3/1972 | Chouings | 303/22.5 |
| 3,665,957 | 5/1972 | Fulmer et al. | 303/52 |
| 4,053,185 | 10/1977 | Carre | 303/9.69 |
| 4,101,176 | 7/1978 | Carre et al. | 303/9.75 |
| 4,371,215 | 2/1983 | Kawaguchi | 303/22.4 |
| 4,623,200 | 11/1986 | Ando et al. | 303/56 |
| 4,750,786 | 6/1988 | Adachi et al. | 303/22.8 |
| 4,781,420 | 11/1988 | Yamakoshi | 303/22.8 |
| 4,915,457 | 4/1990 | Schopper | 303/22.8 |
| 5,246,277 | 9/1993 | Yamakoshi | 303/9.69 |
| 5,560,689 | 10/1996 | Yamakoshi et al. | 303/22.8 |
| 5,984,428 | 11/1999 | Tamakoshi | 303/22.8 |

FOREIGN PATENT DOCUMENTS

| | | |
|---|---|---|
| 63-148567 | 9/1988 | Japan . |
| 3-22055 | 5/1991 | Japan . |
| 4-125965 | 11/1992 | Japan . |

OTHER PUBLICATIONS

Translation of the Claim of Japanese Utility Model Provisional Publication No. 63–148567/'88.
Translation of the Claim of Japanese Utility Model Publication No. 3–22055/'91.

Primary Examiner—Robert J. Oberleitner
Assistant Examiner—Thomas J. Williams
Attorney, Agent, or Firm—Alston & Bird LLP

[57] ABSTRACT

The present invention discloses a liquid pressure control device (1) for load responding brake. This liquid pressure control device (1) comprises valve mechanisms (5) and (6) for reducing liquid pressure from a brake master cylinder and transmitting reduced liquid pressure to rear wheel brake cylinders, these operations being performed by opening/closing valves with a pair of plungers (3) and (4) which respond to loads independently of each other by the liquid pressure from the brake master cylinder, and a load sensing mechanism (11) for moving the pressure reducing operation starting points of the valve mechanisms (5) and (6) by applying loads to the plungers according to the movable load amount of a vehicle. A recessed section (14b) is formed in a portion of an equalizer (14) brought into contact with a load sensing lever (13), and a buffer member (19a) made of an elastic material is fixed in this recessed section (14b). During non-operation, the equalizer (14) and the load sensing lever (13) are kept away from each other by the buffer member (19a). During operation, by pressing and deforming the buffer member (19a) with the load sensing lever (13), direct contact is made between the equalizer (14) and the load sensing lever (13).

Thus, hitting sounds produced from the load sensing mechanism can be prevented at the time of a sudden brake operation or brake non-operation during traveling of the vehicle, and the durability of the used buffer member can be improved.

3 Claims, 6 Drawing Sheets

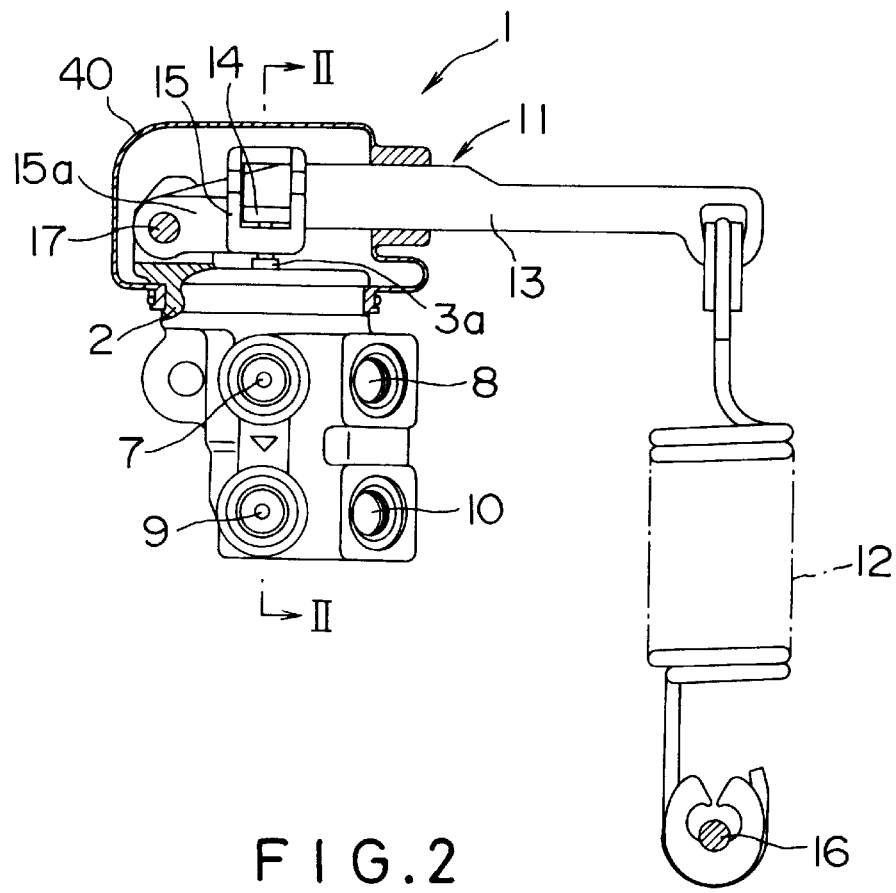
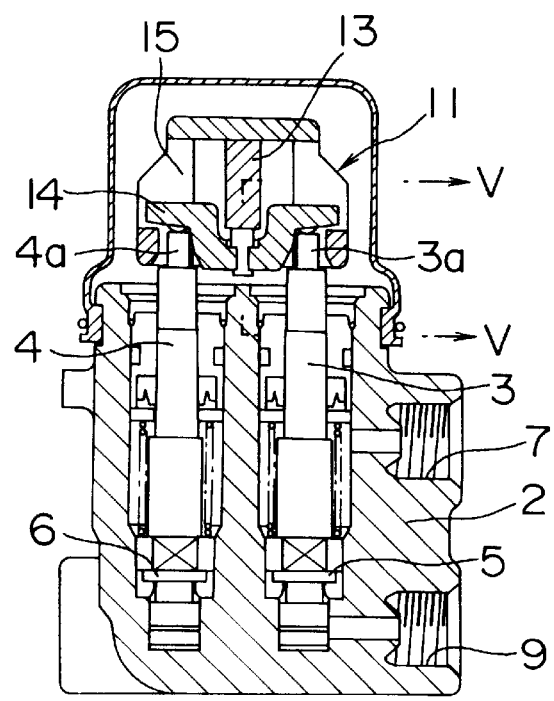

FIG. 11(a)
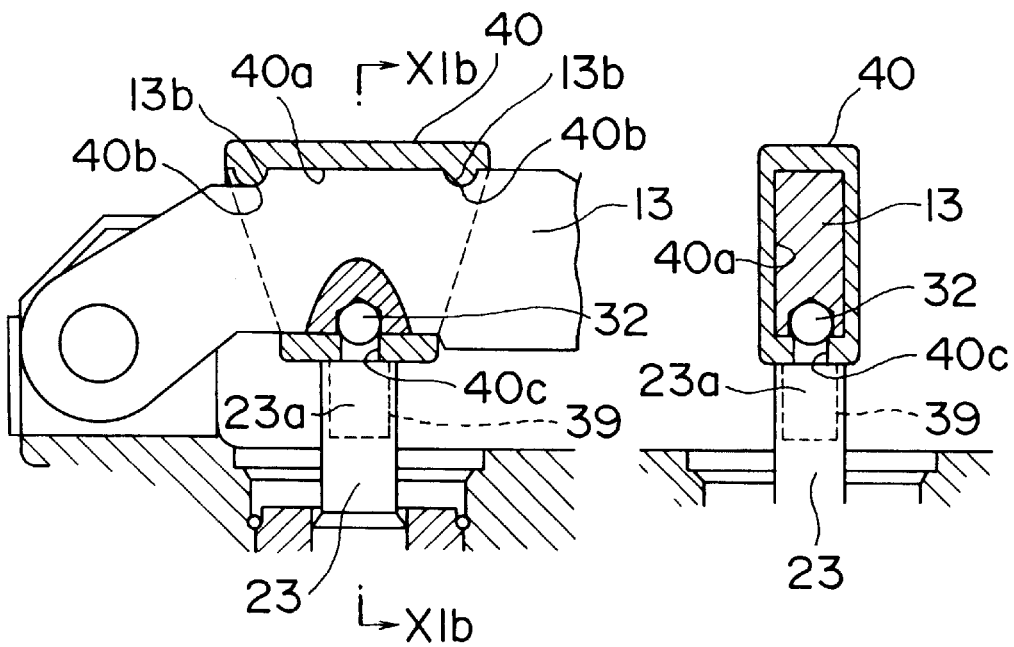
FIG. 11(b)
FIG. 12(a)
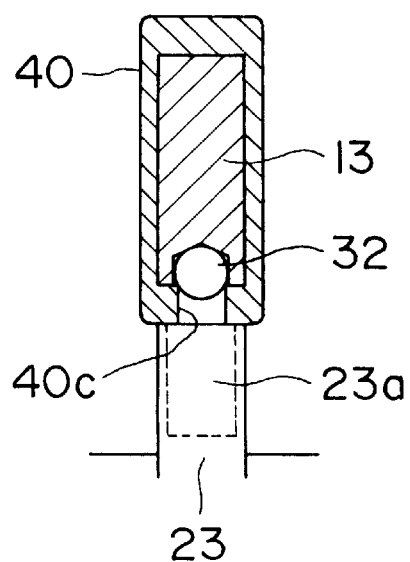
FIG. 12(b)
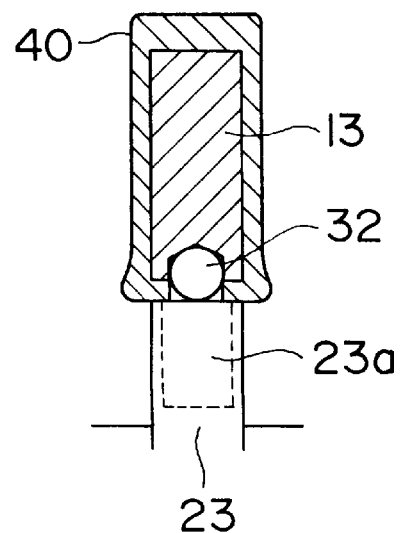

LIQUID PRESSURE FROM A MASTER CYLINDER

TO A BRAKE CYLINDER OF RIGHT REAR WHEEL

LIQUID PRESSURE CONTROL DEVICE FOR LOAD RESPONDING BRAKE

BACKGROUND OF THE INVENTION

1. Field of the Invention

The present invention relates to a liquid pressure control device for an automobile load responding brake, which transmits liquid pressure outputted from a master cylinder or the like to a rear wheel brake cylinder by reducing the liquid pressure at a predetermined ratio corresponding to the amount of movable load. More particularly, the invention relates to the improvement of a load sensing mechanism.

2. Description of the Related Art

The liquid pressure control device of the above-noted kind relating to the present invention is disposed halfway in a liquid pressure passage leading from the brake master cylinder to rear wheel brake cylinders. During the application of a low braking force in an initial braking stage, a braking force equal to that applied to a front wheel side is given to a rear wheel side. When the braking force exceeds a predetermined value, the braking force smaller than that applied to the front wheel side is given to the rear wheel side. In this way, rear wheel locking is prevented. In addition, for a vehicle such as a truck or the like, the amount of movable load determines the size of a braking force for causing rear wheel locking. Accordingly, the braking force for starting the reduction of the rear wheel braking force is set larger when the amount of movable load is large. When the amount of movable load is small, a braking force for the same purpose is set smaller.

FIG. 13 illustrates a dual type load responding brake liquid pressure control device denoted by a numeral 101. Valves 105 and 106 are opened/closed respectively by a pair of plungers 103 and 104 which are disposed in a housing 102 so as to be freely slid and respond to loads independently of each other by liquid pressure from a master cylinder or the like (not shown). The liquid pressure from the master cylinder or the like is reduced at a predetermined ratio and then transmitted to left and right rear wheel brake cylinders (not shown).

For providing a characteristic to the valves 105 and 106 according to the movable load amount of a vehicle, a device for increasing rear wheel braking force control starting pressure has been known [as is disclosed in Japanese Utility Model Provisional Publication No. 63-148567 (No. 148567/1988)]. This device increases rear wheel braking force control starting pressure more when the amount of movable load is larger by applying forces to the respective plungers 103 and 104 with a load sensing mechanism 111 according to the amount of movable load and changing the pressure reducing operation starting points (pressure) of the valves 105 and 106.

The load sensing mechanism 111 includes a spring for providing a pressing force according to the movable load amount of the vehicle, one end of the spring being connected to an axle side, a load sensing lever 113, one end of the load sensing lever 113 being supported in the housing 102 of the valves 105 and 106 so as to be swung and the other end thereof being connected to the other end of the spring, an equalizer 114 brought into contact with one end of each of the plungers 103 and 104, and a clamping member 115 for fixing the equalizer 114 at a predetermined position of the load sensing lever 113.

FIG. 14 illustrates a single type load responding brake liquid pressure control device denoted by a numeral 201. A valve is opened/closed by a single plunger 203 which is disposed in a housing 202 so as to be freely slid and responds to a load by liquid pressure from a brake master cylinder or the like. The liquid pressure from the master cylinder or the like is reduced at a predetermined ratio and then transmitted to a rear wheel brake cylinder.

For providing a characteristic to the above-noted valve according to the movable load amount of a vehicle, a device for increasing rear wheel braking force control starting pressure has been known [as is disclosed in Japanese Utility Model Publication No. 3-22055 (No. 22055/1991)]. This device increases rear wheel braking force control starting pressure more when the amount of movable load is larger by applying a force to the single plunger 203 with a load sensing mechanism 211 according to the amount of movable load and changing the pressure reducing operation starting point (pressure) of the valve.

The load sensing mechanism 211 includes a spring for providing a pressing force according to the movable load amount of the vehicle, one end of the spring being connected to an axle side, and a load sensing lever 213 brought into contact with one end of the plunger 203, one end of the load sensing lever 213 being supported in the housing 202 of the valve so as to be swung and the other end thereof being connected to the other end of the spring.

In the liquid pressure control device 101 shown in FIG. 13, the load sensing lever 113 of the load sensing mechanism 111 for applying forces to the plungers 103 and 104 of the valves 105 and 106 according to the amount of movable load and the equalizer 114 provided between the plungers 103 and 104 are brought into point-contact with each other by a projecting section 114a. The equalizer 114 and the plungers 103 and 104 of the valves 105 and 106 are brought into point-contact with each other respectively by projecting sections provided in portions of the equalizer 114 brought into contact with plunger ends 103a and 104a.

However, there is a problem inherent in the liquid pressure control device 101. Specifically, during operation, hitting sounds are produced because of clashing between the load sensing lever 113 and the equalizer 114 or between the equalizer 114 and the plunger ends 103a and 104a. During non-operation, the equalizer 114 is in a free state (there is play). Especially, when the brake is not operated during traveling of the vehicle, the equalizer 114 is vibrated and brought into contact with the load sensing lever 113 or other parts. Consequently, abnormal sounds are produced.

In the single type liquid pressure control device 201 shown in FIG. 14, a stem 214 is fixed in the load sensing lever 213 side of the load sensing mechanism 211 for applying a force to the plunger 203 of the valve according to the amount of movable load. Between the stem 214 and the end of the plunger 203, a cap 216 and a steel ball 217 are disposed in order. The cap 216 is fitted on the stem 214 so as to be slid by interpolating a rubber plate 215 and the steel ball 217 is held in the cap 216. When the brake is operated, even if clashing occurs between the stem 214 and the plunger 203, its impact force is softened or absorbed by the rubber plate 215. Thereby, abnormal sounds are prevented from being produced.

However, there is also a problem inherent in this single type liquid pressure control device 201. Specifically, as described above, an impact force is softened or absorbed by the rubber plate 215 between the load sensing lever 213 and the end of the plunger 203 and thereby the occurrence of abnormal sounds can be prevented. But the rubber plate 215 is not so durable, the structure of the device is made complex and manufacturing costs are increased.

SUMMARY OF THE INVENTION

The present invention was made in order to solve the above-discussed problems. It is an object of the invention to provide a liquid pressure control device for load responding brake, which can prevent hitting sounds produced from a load sensing mechanism at the time of a sudden brake operation or at the time of brake non-operation during traveling of a vehicle and reduce the play of the load sensing mechanism at the time of brake non-operation.

It is another object of the present invention to provide a simply structured liquid pressure control device for load responding brake, which can improve the durability of a buffer member for preventing the occurrence of hitting sounds and reduce manufacturing costs.

In order to achieve the objectives, the constitution of the liquid pressure control device of the present invention is characterized as follows.

(1) The liquid pressure control device comprises valve mechanisms for reducing liquid pressure from a brake master cylinder or the like at a predetermined ratio and transmitting reduced liquid pressure to left and right rear wheel brake cylinders, these operations being performed by opening/closing the valves respectively with a pair of plungers which are disposed in a housing so as to be freely slid and respond to loads independently of each other by the liquid pressure from the master cylinder or the like, and a load sensing mechanism for moving the pressure reducing operation starting points of the valve mechanisms by applying loads to the plungers according to the movable load amount of a vehicle. The load sensing mechanism includes a spring for providing an extension force according to the movable load amount of the vehicle, one end of the spring being connected to an axle side, a load sensing lever, one end of the load sensing lever being supported in the housing of the valve mechanisms so as to be swung and the other end thereof being connected to the other end of the spring, an equalizer brought into contact with one end of each of the plungers and a clamping member for fixing the equalizer at a predetermined position of the load sensing lever. In the liquid pressure control device thus constructed, a recessed section is formed in a portion of the equalizer brought into contact with the load sensing lever, and a buffer member made of an elastic material is fixed in the recessed section. During non-operation, the equalizer and the load sensing lever are kept away from each other by the buffer member. During operation, the equalizer and the load sensing lever are brought into direct contact with each other by pressing and deforming the buffer member with the load sensing lever.

(2) In the liquid pressure control device described above in (1), the buffer member is made of a rubber material and molded integrally with the equalizer.

(3) In the liquid pressure control device described above in (1), the recessed section of the equalizer is a step hole, and its large diameter portion is formed in a side brought into contact with the load sensing lever. The buffer member is formed in a cylindrical shape with a step. The buffer member has an outer diameter slightly smaller than the large diameter portion of the step hole such that its large diameter portion is disposed therein. The buffer member also has an outer diameter such that its small diameter portion is inserted into the small diameter portion of the step hole.

(4) The liquid pressure control device comprises a valve mechanism for reducing liquid pressure from a brake master cylinder or the like at a predetermined ratio and transmitting reduced liquid pressure to rear wheel brake cylinders, these operations being performed by opening/closing the valve with a plunger which is disposed in a housing so as to be freely slid and responds to a load by the liquid pressure from the brake master cylinder or the like, and a load sensing mechanism for moving the pressure reducing operation starting point of the valve mechanism by applying a load to the plunger according to the movable load amount of a vehicle. The load sensing mechanism includes a spring for providing an extension force according to the movable load amount of the vehicle, one end of the spring being connected to an axle side, and a load sensing lever brought into contact with one end of the plunger, one end of the load sensing lever being supported in the housing of the valve mechanism so as to be swung and the other end thereof being connected to the other end of the spring. In the liquid pressure control device thus constructed, a buffer member is disposed between the load sensing lever and the plunger end brought into contact therewith, the buffer member having a hole in the contact portion and made of an elastic material. During non-operation, the plunger and the load sensing lever are kept away from each other by the buffer member. During operation, the plunger end and the load sensing lever are brought into direct contact with each other through the hole of the buffer member by pressing and deforming the buffer member with the load sensing lever.

With the liquid pressure control device of the present invention constructed in the above-described manner, at the time of a sudden brake operation, an impact force produced from the load sensing mechanism is effectively absorbed and damped by the buffer member made of an elastic material. Thus, the occurrence of hitting sounds is prevented. At the time of brake non-operation during traveling of the vehicle, the equalizer and the load sensing lever are kept away from each other by the buffer member. Thus, the play of the load sensing mechanism can be suppressed and the occurrence of abnormal sounds by clashing caused by the play can be prevented.

At the time of a brake operation, by pressing and deforming the buffer member with the load sensing lever, a direct contact is made between the load sensing lever and the equalizer or between the load sensing lever itself or the small ball member thereof and the plunger. Thus, the durability of the buffer member can be improved. Also, the number of part items can be reduced, assembling work can be facilitated and manufacturing costs can be reduced.

BRIEF DESCRIPTION OF THE DRAWINGS

FIG. 1 is a front view showing a dual type liquid pressure control device for load responding brake of a first embodiment of the present invention, including main portions of the liquid pressure control device in section.

FIG. 2 is a sectional view taken along a line II—II of FIG. 1.

FIGS. 11(a) and 11(b) are expanded sectional views of yet other examples of FIGS. 7(a) and 7(b), specifically FIG. 11(a) partially showing a contact portion between the load sensing lever 13 and the plunger end 23a and FIG. 11(b) showing a line XIb—XIb of FIG. 11(a).

FIGS. 12(a) and 12(b) are sectional views of FIGS. 11(a) and 11(b), specifically FIG. 12(a) showing a brake non-operation state and FIG. 12(b) showing a brake operation state.

DETAILED DESCRIPTION OF THE PREFERRED EMBODIMENTS

The preferred embodiments of the present invention will now be described in detail with reference to the accompanying drawings.

(FIRST EMBODIMENT)

Figure 3:
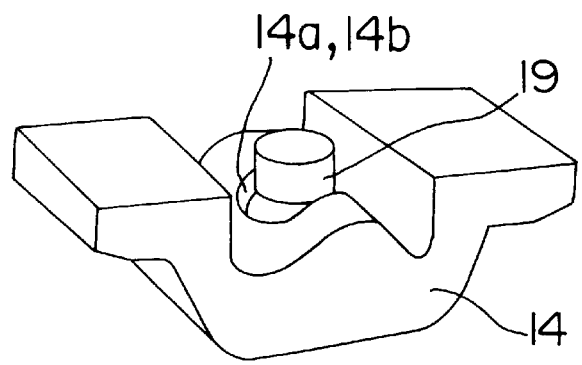
FIG. 3 is a perspective view showing an equalizer.
Figure 4:
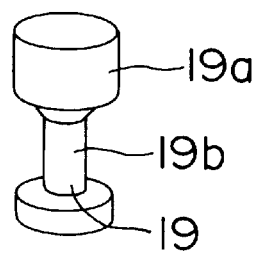
FIG. 4 is a perspective view showing a buffer member.

FIGS. 1 to 5 each illustrates the first embodiment of the liquid pressure control device for load responding brake of the present invention. More particularly, FIG. 1 is a front view showing in section the main portions of the dual type liquid pressure control device. FIG. 2 is a sectional view taken along the line II—II of FIG. 1. FIG. 3 is a perspective view showing an equalizer. FIG. 4 is a perspective view showing a buffer member. FIGS. 5(a) and 5(b) are sectional views taken along the line V—V of FIG. 2, specifically FIG. 5(a) showing a brake non-operation state and FIG. 5(b) showing a brake operation state.

Referring to each of FIGS. 1 and 2, there is shown a load responding brake liquid pressure control device 1, which is normally fixed to the chassis side of a vehicle, for instance an automobile. A pair of plungers 3 and 4 are liquid-tightly disposed in a housing 2 so as to be freely slid. These plungers 3 and 4 respond to loads independently of each other by liquid pressure from a not-shown master cylinder or the like. Valves 5 and 6 formed in the housing 2 are opened/closed by the movements of the plungers 3 and 4. By opening/closing the valves 5 and 6, liquid pressure independently transmitted to inlet ports 7 and 8 from the master cylinder or the like is reduced at a predetermined ratio. Reduced liquid pressure is transmitted from outlet ports 9 and 10 to left and right rear wheel brake cylinders.

A load sensing mechanism 11 is disposed in the upper end of the housing 2 (FIGS. 1 and 2). This load sensing mechanism 11 includes a spring 12, a load sensing lever 13, an equalizer 14 and a clamp 15.

One end of the spring 12 is connected to a rear axle side member 16, and the other end thereof is connected to one end of the load sensing lever 13. The spring 12 transmits an extension force to the load sensing lever 13 side.

The other end of the load sensing lever 13 is supported in one end of the housing 2 by a pin 17 so as to be rotated. The load sensing lever 13 applies the extension force of the spring 12 via the equalizer 14 to plunger ends 3a and 4a, which are liquid-tightly protruded from the plungers 3 and 4 disposed in the housing 2. As shown in FIG. 2, the equalizer 14 is attached to the load sensing lever 13 by the clamp 15. In order to position the equalizer 14 at a predetermined spot on the load sensing lever 13, the clamp 15 includes a positioning section 15a formed to be rotated by the pin 17 provided in one end of the housing 2.

Thus, the pressure reducing operation starting points of the valves 5 and 6 are moved.

Figure 5A:
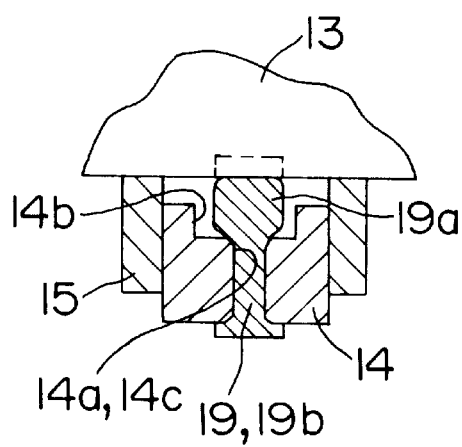
FIGS. 5(*a*) and 5(*b*) are sectional views each taken along a line V—V of FIG. 2, specifically FIG. 5(*a*) showing a brake non-operation state and FIG. 5(*b*) showing a brake operation state.
Figure 5B:
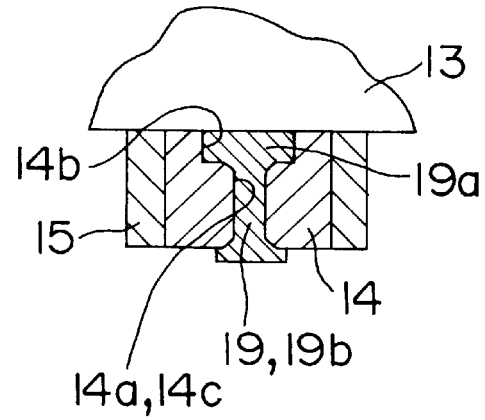

As shown in FIGS. 3, 5(a) and 5(b), the equalizer 14 includes a step hole 14a in a portion brought into contact with the load sensing lever 13 nearly perpendicularly to the same. A large diameter portion 14b of the step hole 14a is formed in a side brought into contact with the load sensing lever 13. As shown in FIG. 4, a buffer member 19 made of an elastic rubber material is formed in a cylindrical shape with a step. The buffer member 19 has an outer diameter slightly smaller than the large diameter portion 14b of the step hole 14a such that its large diameter portion 19a can be disposed in the large diameter portion 14b. The buffer member 19 also has an outer diameter such that its small diameter portion 19b can be inserted into the small diameter portion 14c of the step hole 14a.

As shown in FIG. 5(a), the buffer member 19 is fitted in the step hole 14a of the equalizer 14. At the time of brake non-operation, the equalizer 14 and the load sensing lever 13 are kept away from each other by the large diameter portion 19a of the buffer member 19. At the time of brake operation, as shown in FIG. 5(b), direct contact is made between the equalizer 14 and the load sensing lever 13 by pressing and deforming the large diameter portion 19a of the buffer member 19.

The buffer member 19 may be molded integrally with the equalizer 14.

(SECOND EMBODIMENT)

Figure 6:
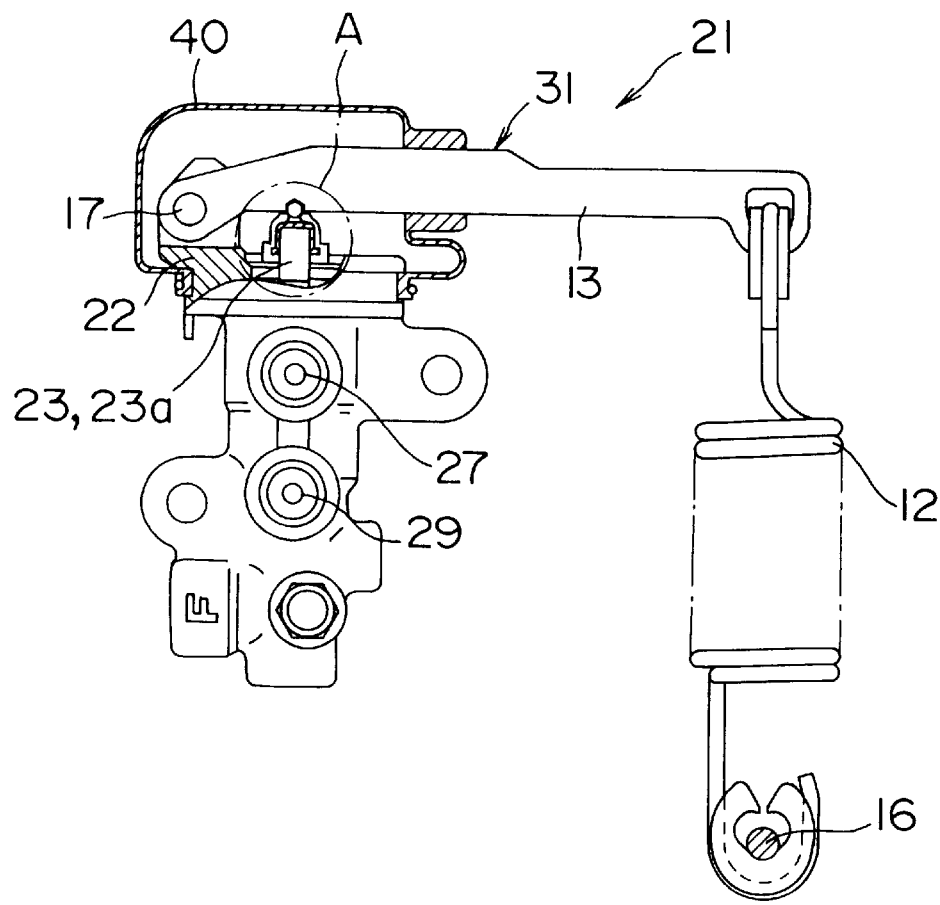
FIG. 6 is a front view showing a single type liquid pressure control device for load responding brake of a second embodiment of the present invention, including main portions of the liquid pressure control device in section.
Figure 7A:
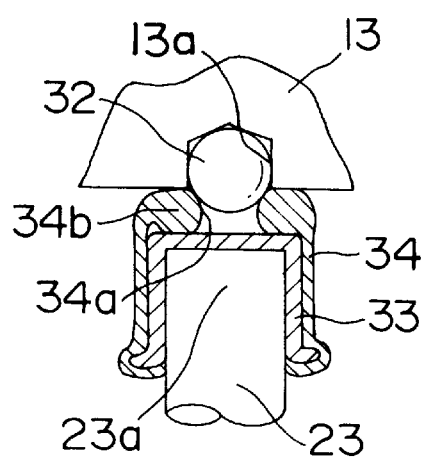
FIGS. 7(a) and 7(b) are expanded sectional views of an A portion of FIG. 6, specifically FIG. 7(a) showing a brake non-operation state and FIG. 7(b) showing a brake operation state.
Figure 7B:
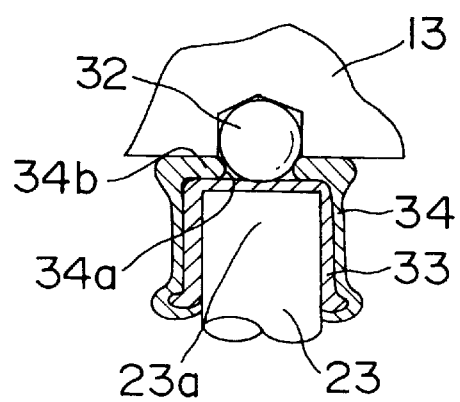

FIGS. 6, 7(a) and 7(b) each illustrates the second embodiment of the liquid pressure control device for load responding brake of the present invention. More particularly, FIG. 6 is a front view showing in section the main portions of the single type liquid pressure control device. FIGS. 7(a) and 7(b) are expanded sectional views of an A portion of FIG. 6, specifically FIG. 7(a) showing a brake non-operation state and FIG. 7(b) showing a brake operation state.

Referring to FIG. 6, there is shown a load responding brake liquid pressure control device 21, which is normally fixed to the chassis side of a vehicle, for instance an automobile. A plunger 23 is liquid-tightly disposed in a housing 22 so as to be freely slid. The plunger 23 responds to a load by liquid pressure from a not-shown master cylinder or the like. A not-shown valve formed in the housing 22 is opened/closed by the movement of the plunger 23. By opening/closing the valve, liquid pressure transmitted from the master cylinder or the like to an inlet port 27 is reduced at a predetermined ratio. Then, reduced liquid pressure is transmitted from an outlet port 29 to left and right rear wheel brake cylinders.

A load sensing mechanism 31 is disposed in the upper end of the housing 22 (FIG. 6). This load sensing mechanism 31 includes a spring 12 and a load sensing lever 13.

One end of the spring 12 is connected to a rear axle side member 16, and the other end thereof is connected to one end of the load sensing lever 13. The spring 12 transmits an extension force to the load sensing lever 13 side according to the movable load amount of the vehicle.

The other end of the load sensing lever 13 is supported in one end of the housing 22 by a pin 17 so as to be rotated. The load sensing lever 13 applies the extension force of the spring 12 to one end 23*a* of the plunger 23, which is liquid-tightly protruded from the plunger 23 disposed in the housing 22.

Thus, the pressure reducing operation starting point of the valve is moved.

As shown in FIG. 7(*a*), a notched section 13*a* is formed in a position of the load sensing lever 13 brought into contact with one end 23*a* of the plunger. A small ball member 32, for instance a small diameter steel ball, is fixed in the notched section 13*a*. A protective iron cap 33 is placed on the plunger end (made of an aluminum material) 23*a*. An elastic cup-like buffer member 34 made of, for instance a rubber material, is placed thereon. The buffer member 34 includes in its bottom portion a hole 34*a* smaller than the outer diameter of the small ball member 32. The peripheral portion 34*b* of the small hole 34*a* of the buffer member 34 is formed to be thick.

During brake non-operation, as shown in FIG. 7(*a*), the plunger 23 and the small ball member 32 of the load sensing lever 13 are kept away from each other by the peripheral portion 34*b* of the small hole 34*a* of the buffer member 34. During brake operation, by pressing and deforming the peripheral portion 34*b* of the buffer member 34 with the load sensing lever 13, direct contact is made between the plunger 23 and the small ball member 32 of the load sensing lever 13 through the small hole 34*a* of the buffer member 34.

Figure 8A:
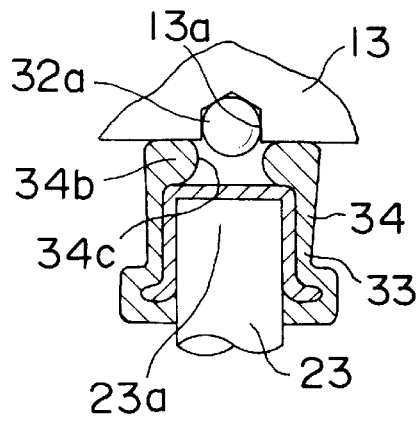
FIGS. 8(a) and 8(b) are expanded sectional views of other examples of FIGS. 7(a) and 7(b), specifically FIG. 8(a) showing a brake non-operation state and FIG. 8(b) showing a brake operation state.
Figure 8B:
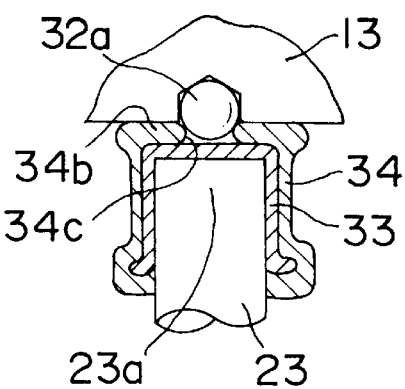

FIGS. 8(*a*) and 8(*b*) are expanded sectional views of other examples of FIGS. 7(*a*) and 7(*b*), specifically FIG. 8(*a*) showing a brake non-operation state and FIG. 8(*b*) showing a brake operation state.

In FIGS. 8(*a*) and 8(*b*), a small ball member 32*a*, for instance a small diameter steel ball, fixed in the notched section 13*a* of the load sensing lever 13 has an outer diameter smaller than that of the small ball member 32 shown in FIG. 7(*a*). The cap 33 is placed on the plunger end 23*a*, and a cup-like buffer member 34 is placed thereon. This buffer member 34 includes in its bottom portion a hole 34*c* larger than the outer diameter of the small ball member 32*a*. The peripheral portion 34*b* of the small hole 34*c* of the buffer member 34 is formed to be thick.

In this case, during brake non-operation, as shown in FIG. 8(*a*), the plunger 23 and the small ball member 32*a* of the load sensing lever 13 are kept away from each other by the peripheral portion 34*b* of the small hole 34*c* of the buffer member 34. During brake operation, by pressing and deforming the peripheral portion 34*b* of the buffer member 34 with the load sensing lever 13, direct contact is made between the plunger 23 and the small ball member 32*a* of the load sensing lever 13 through the small hole 34*c* of the buffer member 34.

Accordingly, even if the inner diameter of the small hole 34*c* provided in the bottom portion of the cup-like buffer member 34 is larger than the outer diameter of the small ball member 32*a*, action similar to that described above with reference to FIGS. 7(*a*) and 7(*b*) is obtained.

Instead of the small ball members 32 and 32*a*, projecting sections having shapes similar to these members 32 and 32*a* may be formed in the load sensing lever 13.

Figure 9A:
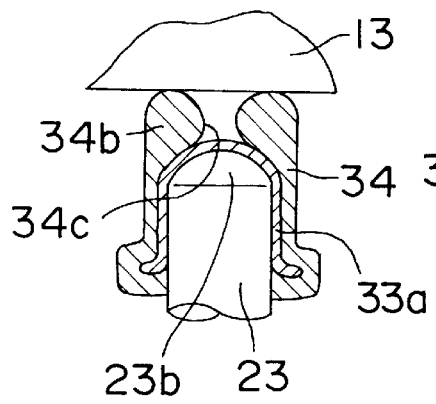
FIGS. 9(a) and 9(b) are expanded sectional views of yet other examples of FIGS. 7(a) and 7(b), specifically FIG. 9(a) showing a brake non-operation state and FIG. 9(b) showing a brake operation state.
Figure 9B:
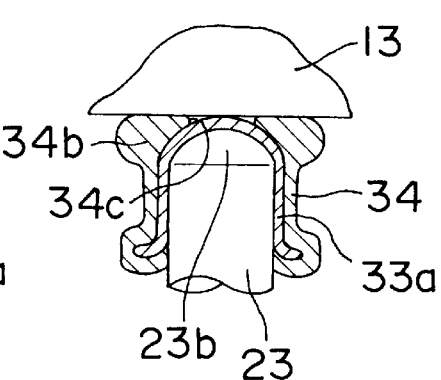

FIGS. 9(*a*) and 9(*b*) are expanded sectional views of yet other examples of FIGS. 7(*a*) and 7(*b*), specifically FIG. 9(*a*) showing a brake non-operation state and FIG. 9(*b*) showing a brake operation state.

In FIGS. 9(*a*) and 9(*b*), no small ball member like the small ball 32 or 32*a* is fixed in the load sensing lever 13. Instead, the plunger end 23*a* is formed to be a spherical end 23*b*. A protective iron cap 33*a* shaped spherical in its bottom portion is placed over the plunger end (made of an aluminum material) 23*b*. Then, an elastic cup-like buffer member 34 made of, for instance a rubber material, is placed thereon. The buffer member 34 includes in its bottom portion a small hole 34*c* like that shown in FIGS. 8(*a*) and 8(*b*).

In this case, during brake non-operation, as shown in FIG. 9(*a*), the plunger 23 and the load sensing lever 13 are kept away from each other by the peripheral portion 34*b* of the small hole 34*c* of the buffer member 34. During brake operation, by pressing and deforming the peripheral portion 34*b* of the buffer member 34 with the load sensing lever 13, direct contact is made between the plunger 23 and the load sensing lever 13 through the small hole 34*c* of the buffer member 34.

Thus, action similar to that described above with reference to FIGS. 7(*a*) and 7(*b*) and 8(*a*) and 8(*b*) is obtained.

Figure 10A:
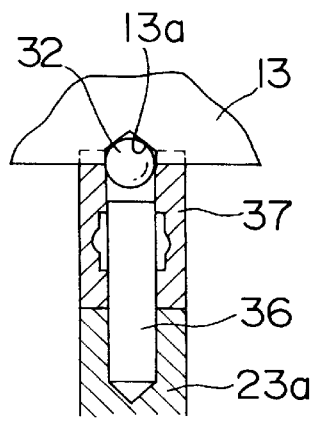
FIGS. 10(a) and 10(b) are expanded sectional views of yet other examples of FIGS. 7(a) and 7(b), specifically FIG. 10(a) showing a brake non-operation state and FIG. 10(b) showing a brake operation state.
Figure 10B:
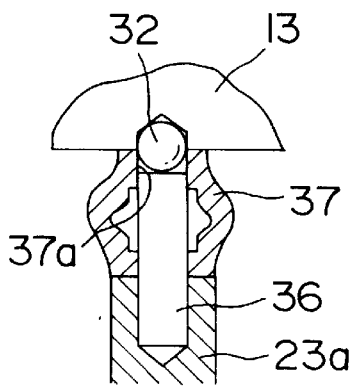
Figure 13:
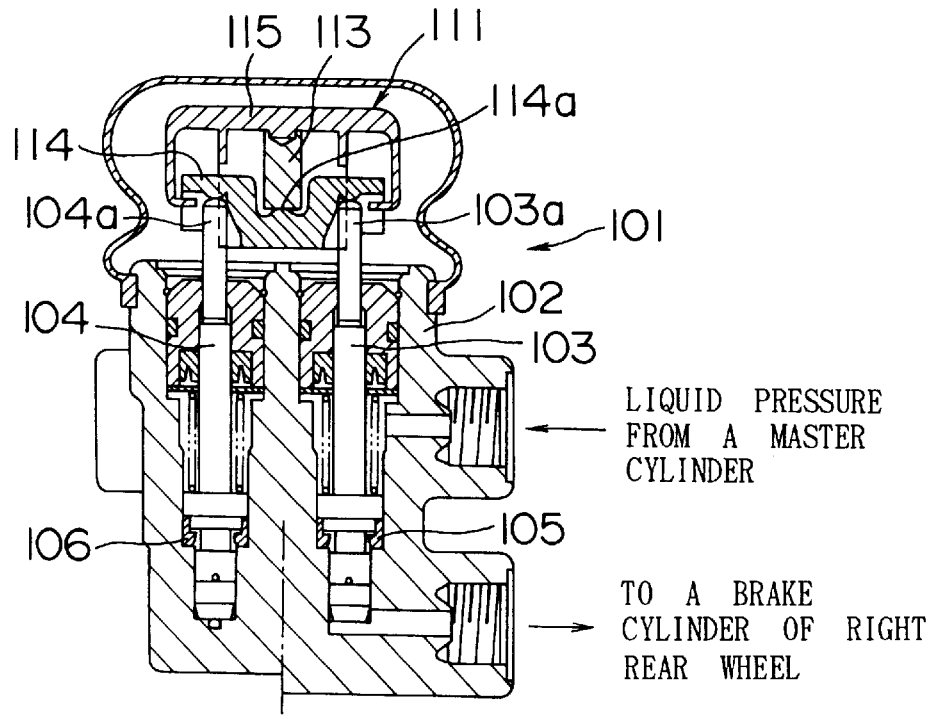
FIG. 13 is a sectional view showing a dual type liquid pressure control device for load responding brake relating to the present invention.
Figure 14:
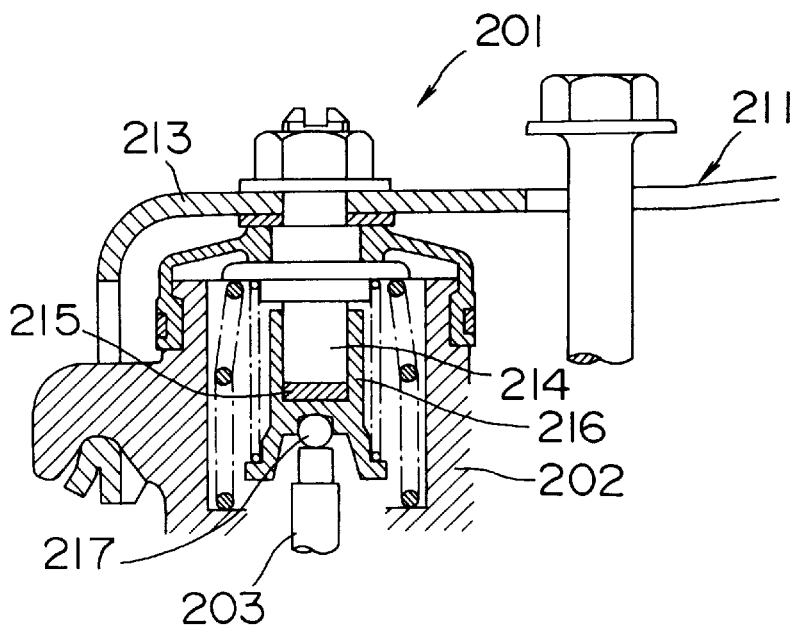
FIG. 14 is a sectional view showing main portions of a single type liquid pressure control device for load responding brake relating to the present invention.

FIGS. 10(*a*) and 10(*b*) are expanded sectional views of yet other examples of FIGS. 7(*a*) and 7(*b*), specifically FIG. 10(*a*) showing a brake non-operation state and FIG. 10(*b*) showing a brake operation state.

In FIGS. 10(*a*) and 10(*b*), a strut 36 having an outer diameter nearly similar to that of the small ball member 32 is erected in the axial direction of the plunger end 23*a*. Instead of the buffer member 34, an elastic cylindrical buffer member 37 (center inner peripheral portion is slightly thin) made of, for instance a rubber material, is disposed so as to cover both of the strut 36 and the small ball member 32 fixed in the load sensing lever 13.

In this case, during brake non-operation, as shown in FIG. 10(*a*), the plunger 23 and the small ball member 32 of the load sensing lever 13 are kept away from each other by the buffer member 37. During brake operation, as shown in FIG. 10(*b*), by pressing and deforming the center portion of the buffer member 37 with the load sensing lever 13, direct contact is made between the plunger 23 and the small ball member 32 of the load sensing lever 13 through the inner diameter portion 37*a* of the buffer member 37.

Referring to FIGS. 11(*a*) and 11(*b*) and 12(*a*) and 12(*b*), there are shown in expanded section yet other examples of FIGS. 7(*a*) and 7(*b*). Specifically, FIG. 11(*a*) is a partial sectional view showing a contact portion between the load sensing lever 13 and one end 23*a* of the plunger 23. FIG. 11(*b*) is a sectional view taken along the line XIb—XIb of FIG. 11(*a*). FIG. 12(*a*) is a sectional view showing a brake non-operation state. FIG. 12(*b*) is a sectional view showing a brake operation state.

In each of FIGS. 11(*a*) and 11(*b*), a columnar contact member 39 is buried in the axial direction of the plunger end 23*a* so as to have identical end surfaces. This contact member 39 is made of steel (e.g., bearing steel) having an outer diameter nearly equal to that of the small ball member 32.

Instead of the buffer member 34, there is provided a buffer member 40 which is made of an elastic material, for instance rubber, to be rectangular in outer section. In its inside, this buffer member 40 includes a rectangular through-hole 40a through which the load sensing lever 13 can be inserted and projecting sections 40b and 40b in the two places of the upper surface of the through-hole 40a. The buffer member 40 is inserted and disposed on the load sensing lever 13. The projecting sections 40b and 40b are fitted and fixed in recessed sections 13b and 13b formed in the load sensing lever 13. In the bottom portion of the buffer member 40, a hole 40c smaller than the outer diameter of the small ball member 32 is provided in a contact portion between the load sensing lever 13 and the plunger end 23a. Preferably, the periphery of the small hole 40c of the buffer member 40 should be formed slightly thick.

In this case, during brake non-operation, as shown in FIG. 12(a), the plunger 23 and the small ball member 32 of the load sensing lever 13 are kept away from each other by the buffer member 40. During brake operation, as shown in FIG. 12(b), by pressing and deforming the bottom portion of the buffer member 40 with the load sensing lever 13 and the small ball member 32, direct contact is made between the plunger 23 and the small ball member 32 of the load sensing lever 13 through the small hole 40c of the buffer member 40.

Referring again to FIG. 1, in order to protect the mechanism portions of the plunger ends 3a and 4a, the equalizer 14, and so on, from the intrusion of foreign matters, a boot 40 is fixed to the housing 2. A like boot is also fixed to the housing 22 shown in FIG. 6, in order to protect the mechanism portions of the plunger end 23a, the load sensing lever 13, and so on, from the intrusion of foreign matters.

The teachings of the present invention are not limited to the technical forms described above with reference to the preferred embodiments. Other modes having like functions can be used, and various modifications and additions can be made to the technical forms of the present invention within the scope of the above-described constitution.

As apparent from the foregoing description, the liquid pressure control device for load responding brake of the present invention is effective in the following points.

According to the first embodiment, the recessed section is formed in a portion of the equalizer, which is brought into contact with the load sensing lever, and the buffer member made of an elastic material is fixed in the recessed section. During non-operation, the equalizer and the load sensing lever are kept away from each other by the buffer member. During operation, by pressing and deforming the buffer member with the load sensing lever, direct contact is made between the equalizer and the load sensing lever. Accordingly, hitting sounds produced from the load sensing mechanism can be prevented at the time of a sudden brake operation or brake non-operation during traveling of the vehicle, and the play of the load sensing mechanism can be reduced at the time of brake non-operation. Further, the structure of the device can be simplified, the durability of the buffer member for preventing the occurrence of hitting sounds can be improved and manufacturing costs can be reduced.

According to the second embodiment, the cup-like buffer member having a hole in its bottom portion and made of an elastic material is placed on the plunger end, which is brought into contact with the load sensing lever. During non-operation, the plunger and the load sensing lever are kept away from each other by the buffer member. During operation, by pressing and deforming the buffer member with the load sensing lever, direct contact is made between the plunger end and the load sensing lever through the hole of the buffer member. Accordingly, the play of the load sensing mechanism can be reduced at the time of brake non-operation. Further, the structure of the device can be simplified, the durability of the buffer member for preventing the occurrence of hitting sounds can be improved and manufacturing costs can be reduced.

What is claimed is:

1. A liquid pressure control device for a load responding brake comprising:

valve mechanisms for reducing liquid pressure from a brake master cylinder at a predetermined ratio and transmitting reduced liquid pressure to left and right rear wheel brake cylinders, said operations being performed by opening/closing valves respectively with a pair of plungers which are disposed in a housing so as to be freely slid and respond to loads independently of each other by said liquid pressure from said brake master cylinder; and a load sensing mechanism for moving pressure reducing operation starting points of said valve mechanisms by applying loads to said plungers according to a movable load amount of a vehicle, said load sensing mechanism including a spring for providing an extension force according to said movable load amount of said vehicle with one end of said spring being connected to an axle side, a load sensing lever with one end of said load sensing lever being supported in said housing of said valve mechanisms so as to be swung and the other end of said load sensing lever being connected to the other end of said spring, an equalizer brought into contact with one end of each of said plungers, and a clamping member for fixing said equalizer at a predetermined position of said load sensing lever, wherein a recessed section is formed in a portion of said equalizer brought into contact with said load sensing lever and a buffer member made of an elastic material is fixed in said recessed section such that, during non-operation, said equalizer and said load sensing lever are kept away from each other by said buffer member and further that, during operation, direct contact is made between said equalizer and said load sensing lever by pressing and deforming said buffer member with said load sensing lever.

2. A liquid pressure control device for a load responding brake according to claim 1, wherein said buffer member is made of a rubber material and molded integrally with said equalizer.

3. A liquid pressure control device for a load responding brake according to claim 1, wherein said recessed section of said equalizer is formed to be a step hole, its large diameter portion being formed in a side brought into contact with said load sensing lever, and said buffer member is formed in a cylindrical shape with a step, said buffer member having an outer diameter slightly smaller than said large diameter of said step hole for disposing its large diameter portion in said large diameter portion of said step hole, and an outer diameter for inserting its small diameter portion into a small diameter portion of said step hole.

* * * * *